May 8, 1951  E. W. SCHWARTZ ET AL  2,552,017
FLOW METER
Filed April 26, 1947
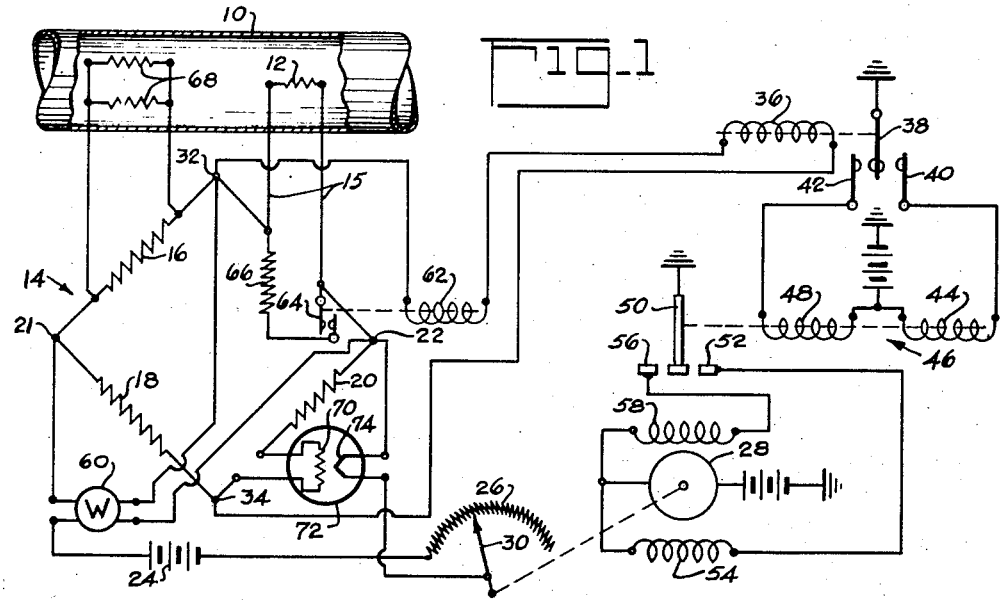
Fig. 1
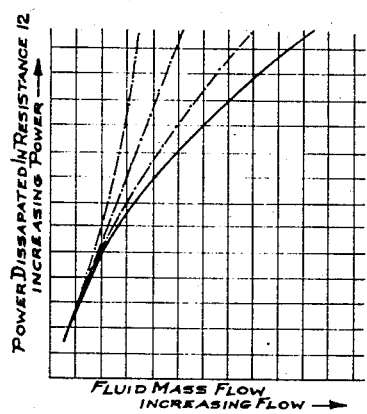
Fig. 3
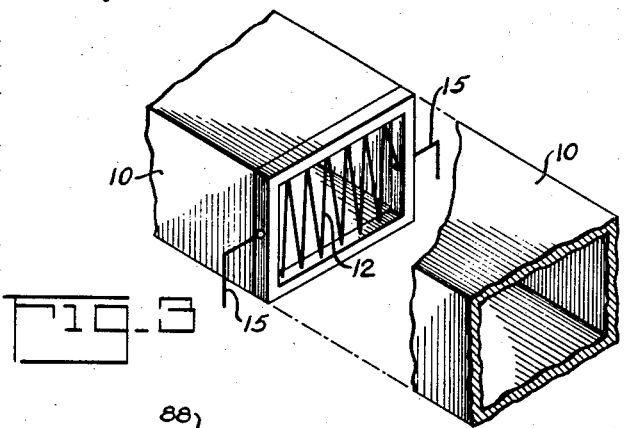
Fig. 2
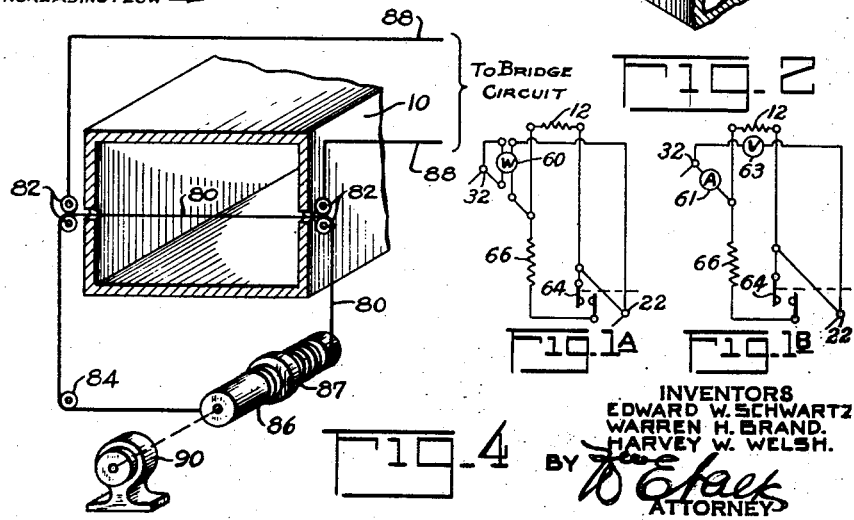
Fig. 4 / Fig. 1A / Fig. 1B
INVENTORS
EDWARD W. SCHWARTZ
WARREN H. BRAND
HARVEY W. WELSH
BY
ATTORNEY Patented May 8, 1951

2,552,017

UNITED STATES PATENT OFFICE 2,552,017

FLOWMETER

Edward W. Schwartz, Pompton Plains, Warren H. Brand, East Orange, and Harvey W. Welsh, Lodi, N. J., assignors to Wright Aeronautical Corporation, Lodi, N. J., a corporation of New York Application April 26, 1947, Serial No. 744,102

4 Claims. (Cl. 73—204)

This invention relates to fluid flow measuring systems and is particularly directed to a fluid flow measuring system in which the flow sensitive element comprises an electrically heated resistance disposed in the flow path of the fluid to be measured.

An object of this invention is to provide a novel and simple fluid flow measuring system which is accurate over a wide range of flows and is substantially unaffected by the fluid velocity distribution across the fluid flow path. In addition, because the fluid flow measuring system of the present invention is durable and occupies very little space it is particularly suited for measuring the airflow to an aircraft engine. Although the invention has been designed for this latter purpose it obviously is of general application.

Specifically the invention comprises an electrically heated resistance having a high positive temperature coefficient of resistance. This resistance is connected into an electric bridge circuit and is disposed across the flow path of the fluid whose flow is to be measured. The fluid flow over said resistance removes heat from said resistance and therefore the magnitude of said resistance depends both on the magnitude of the electric power expended therein and on the mass flow of fluid thereover. The arrangement is such that changes in the magnitude of said resistance disturbs the balance of said bridge circuit, whereupon the electric power dissipated or consumed in said resistance is automatically varied to restore the bridge balance.

Other objects of the invention will become apparent upon reading the next detailed description in connection with the drawing, in which;

Figure 1 is a diagrammatic view of a flow measuring system embodying the invention;

Figures 1A and 1B are partial views illustrating modifications of Figure 1;

Figure 2 is a perspective view, partly in section, illustrating a flow sensitive resistance;

Figure 3 is a graphical view illustrating the relation between the fluid mass flow and the electric power dissipated in the flow sensitive resistance; and Figure 4 is a diagrammatic view of a modified form of the invention.

Referring to the drawing, a duct 10 forms part of the flow path of the fluid to be measured. A suitable resistance 12 is disposed in the duct 10 in the flow path of said fluid. As illustrated in Figure 2, the resistance 12 comprises a wire shaped in the form of a grid disposed in a plane across the duct 10. The resistance 12 is made of material—such as pure nickel or "Hytempco" an alloy of iron and nickel—having a high positive temperature coefficient of resistance and preferably the resistance is such that its magnitude varies substantially linearly with its temperature in the operating temperature range. If the velocity distribution of the fluid across the duct 10 is not too irregular, a single length of wire, extending across said duct, may be substituted for the grid shaped resistance 12—for example as illustrated in Figure 4.

The resistance 12 is connected into a Wheatstone bridge circuit by wire leads 15 so as to form one arm of this circuit and the resistance 12 is heated by the electric current flowing therethrough. Fixed resistances 16, 18 and 20 are connected into at second, third and fourth arms of the bridge. The resistances 16, 18 and 20 are made of material—such as "Manganin"—having a negligibly low temperature coefficient of resistance. Manganin is primarily an alloy of copper, nickel and manganese and has long been employed as resistance wire in electrical measurements.

Electric power is supplied to the opposite terminals 21 and 22 of the bridge circuit 14 from a source of direct current 24 through a variable resistance 26. By increasing the magnitude of the resistance 26, the amount of current flowing in the various arms of the bridge circuit is decreased and vice versa. Accordingly adjustment of the resistance 26 changes the electric power dissipated or consumed in the resistance 12, thereby varying the temperature and magnitude of this resistance. Regardless of the adjustment of the resistance 26, the resistances 16, 18, and 20 remain fixed because of their negligibly low temperature coefficient of resistance. The magnitudes of the resistances 12, 16, 18, and 20 are so chosen that, by adjustment of the external bridge resistance 26, the amount of power expended in bridge resistance 12 can be controlled so as to regulate the magnitude of this resistance 12 in order to keep the bridge circuit balanced in spite of changes in the fluid mass flow over said resistance 12 with its accompanying changes in the rate of heat removal from said resistance. An electric motor 28 is drivably connected to an adjustable contact arm 30 of the resistance 26 for adjusting the magnitude of this resistance in response to unbalance of the bridge circuit 14 and in a direction to regulate the magnitude of the resistance 12 to restore the balance of the bridge circuit.

In order to effect operation of the motor 28, a suitable power amplifier is connected between the output bridge terminals 32 and 34 and the motor 28. For this purpose, a sensitive polarized relay 36 is connected across the bridge terminals 32 and 34. Upon bridge unbalance in one direction, as a result of an increase in the resistance 12, the relay 36 is energized to move its contact 38 into engagement with a contact 40, thereby completing a circuit through a winding 44 of a power relay 46. Similarly, upon bridge unbalance in the reversed direction, the electric current flows through the relay 36 in the opposite direction to move its contact 38 into engagement with a contact 42, thereby completing a circuit through a winding 48 of the power relay 46. Upon energization of the power relay winding 44, power relay contact 50 engages a contact 52 to complete a circuit to the motor 28 through its winding 54, whereupon the motor 28 operates in a direction to increase the resistance 26. Similarly upon energization of power relay winding 48, the power relay contact 50 engages a contact 56 to complete a circuit to the motor 28 through its winding 58, whereupon the motor 28 operates in a reversed direction to decrease the resistance 26.

With the aforedescribed arrangement whenever the bridge circuit 14 is unbalanced, the motor 28 is rendered operative to adjust the external bridge resistance 26, in one direction or the other, until bridge balance is restored. The particular means for amplifying the output of the bridge circuit 14, upon bridge unbalance, forms no part of the present invention. Obviously other forms of amplifiers—such as electronic tube amplifiers—could be used for effecting operation of a suitable motor for varying the voltage applied to the bridge terminals 20 and 22 in order to keep the bridge balanced.

Upon a flow of electric current through the resistance 12, its temperature and therefore its resistance assumes a value, such that the electric power dissipated or consumed in the resistance 12 is equal to the rate at which heat is given up by the resistance 12 to the fluid in the duct 10. At a given temperature of the fluid in the duct 10 and at a particular temperature of the resistance 12, the rate at which the resistance 12 gives up heat to said fluid increases and decreases with increase and decrease, respectively, of the mass flow of said fluid. Accordingly in order to keep the bridge circuit 14 in balance it is necessary to vary the rate at which electric power is dissipated in the resistance 12 by varying the external bridge resistance 26. Also it should be noted that since the resistances 16, 18, and 20 have a negligibly low temperature coefficient of resistance, variations in the current flow through these resistances have no effect on their magnitude or the balance of the bridge circuit.

Assuming now that the temperature of the air entering the duct 10 is constant, the operation of the structure so far described is as follows: An increase in the fluid mass flow through the duct 10 increases the rate at which said fluid removes heat from the resistance 12, whereupon the temperature and magnitude of the resistance 12 decreases. This decrease in the magnitude of the resistance 12 unbalances the bridge circuit 14 in a direction to close relay contacts 38 and 42 and contacts 50 and 56 thereby effecting operation of the motor 28 in a direction that increases the electric voltage and power applied across the bridge terminals 20 and 22 by decreasing the resistance 26. The motor 28 operates in this direction until the amount of electric power dissipated or consumed in the resistance 12 is increased sufficiently to restore the resistance to its original magnitude and temperature, at which condition the bridge circuit is rebalanced. Similarly a decrease in the fluid mass flow through the duct 10 decreases the rate at which said fluid cools the resistance 12, whereupon the temperature and magnitude of the resistance 12 increases. This increase in the magnitude of the resistance 12 unbalances the bridge circuit in the opposite direction whereupon relay contacts 38 and 40 and contacts 50 and 52 close to effect reverse operation of the motor 28, thereby decreasing the voltage applied across the bridge terminals 20 and 22 until the amount of electric power dissipated in the resistance 12 is decreased sufficiently to restore the resistance 12 to its original magnitude and temperature. Accordingly, the resistance 12 senses or measures changes in the mass flow of fluid through the duct 10 in that the rate at which electric power is dissipated in the resistance 12 is a function of the fluid mass flow through the duct 10. This relationship is graphically illustrated by the full-line curve in Figure 3.

Preferably the bridge circuit is designed so that in the operating temperature range of the resistance 12, the magnitude of this resistance varies linearly with its temperature. In this way, even though the fluid velocity distribution across the duct 10 is non-uniform, the resistance of each small section of the resistance 12 changes in proportion to the change in the fluid mass flow over each section. Accordingly the average change in the total magnitude of the resistance 12 is proportional to the average change in the fluid mass flow and the resulting change in the electric power dissipated in the resistance 12 to restore its average value is a measure of the average change in the fluid mass flow. Also as previously mentioned, if the variation in velocity across the duct 10 is not too large and/or non-uniform, a single length of wire, extending across the duct 10, may be used for the resistance 12.

The electric power consumed in the resistance 12 may be measured by a wattmeter 60 connected in this arm of the bridge circuit as illustrated in Figure 1A. However, since the bridge circuit is maintained in balanced condition the current element of a wattmeter 60 may be connected external to the bridge in the power supply lead thereto, as illustrated. That is, with the bridge circuit in balance, the total current supplied to the bridge is proportional to the current in each arm of the bridge. Therefore, with the wattmeter 60 connected in the bridge circuit as illustrated in Figure 1, the indications of the meter 60, are proportional to the power consumed in the resistance 12. In view of the relation between this power consumption and the mass flow of fluid in the duct 10, as illustrated in Figure 3, the meter 60 may be calibrated to read this flow directly. Also with the resistance 12 maintained at a constant value, the power consumed or dissipated therein is proportional to both the square of its voltage and to the square of its current. Accordingly, as illustrated in Figure 1B, in lieu of or in addition to the wattmeter 60 an ammeter 61 or a voltmeter 63 could be connected in series or in parallel, respectively, with the resistance 12 for measuring the mass flow of fluid through the duct 10.

With the aforedescribed arrangement, if there is a sudden large decrease in the fluid mass flow, the resistance 12 may overheat. To prevent this possibility a sensitive relay 62 is connected in the output circuit of the bridge 14 in series with the relay 36. The relay 62 is arranged to close a normally open switch 64 when the bridge circuit unbalance voltage exceeds a pre-determined value as a result of an increase in the resistance 12. The switch 64 when closed connects a resistance 66 in parallel with the resistance 12, thereby shunting at least a portion of the current around the resistance 12. In this way if there is a sudden large decrease in the fluid mass flow, the resistance 12 quickly starts to heat up thereby effecting a quick and relatively large increase in the magnitude of the resistance 12, and in the unbalance of the bridge circuit, before the motor 28 can restore the resistance 12 to its original value. If the increase in the resistance 12 exceeds a pre-determined value, the relay 62 operates to connect the shunt resistance 66 around the resistance 12. Connection of the shunt resistance 66 around the resistance 12 immediately lowers the net resistance of this arm of the bridge circuit whereupon the relay 62 opens the switch 64. In this way the relay 62 intermittently opens and closes the switch 64 to reduce the average current flowing through the resistance 12 until the motor 28 has had a chance to at least partially rebalance the bridge by decreasing the voltage connected across the bridge.

In the foregoing description the temperature of the fluid entering the duct 10 has been assumed to be constant. If, at a constant fluid mass flow, the temperature of the fluid entering the duct 10 increases, then the resistance 12 will lose heat to said fluid at a slower rate so that the temperature and magnitude of said resistance will increase. As a result, the motor 28 will operate to decrease the electric power dissipated in resistance 12 whereupon the meter 60 will erroneously indicate a reduced mass flow. However, the bridge circuit may be automatically adjusted to correct or compensate for changes in the fluid temperature. For this purpose the resistance of the bridge arm including the resistance 16 may be automatically increased with increase in the fluid temperature so that a higher magnitude of resistance 12 is necessary to balance the bridge and vice versa. In this way the bridge circuit can be automatically adjusted with changes in the temperature of the fluid so that the power dissipated in the resistance 12 provides an accurate measure of the fluid mass flow regardless of the temperature of the fluid.

As illustrated, instead of varying the magnitude of the resistance 16 itself, one or more resistances 68 are connected in the bridge arm 21, 32. The resistance or resistances 68 may be connected in series with the resistance 16 or, as illustrated, in parallel with the resistance 16. In addition the resistances 68 are disposed in the duct 10 so as to have substantially the same temperature as the fluid therein. The magnitude of the resistances 68 are made quite small with respect to their surface area in order that the electric current flowing through the resistances 68 does not raise their temperature appreciably above that of the surrounding fluid. By suitably selecting the size and material of each of the different resistances 68 it is possible to vary the magnitude of resistance 12 at which the bridge is balanced, at any particular fluid temperature, in order that the power dissipated in the resistance 12 be an accurate measure of the fluid mass flow regardless of the fluid temperature.

The full-line curve of Figure 3 illustrates the relation between the power dissipated in the resistance 12 and the mass flow of the fluid in the duct 10 for the system so far described. If desired, the nature of this relation may be varied—for example, to that illustrated by any of the dot and dash line curves in Figure 3. For this purpose a resistance 70 is connected in series with the resistance 20. The resistance 70 has a high positive temperature coefficient of resistance and is disposed in a chamber 72 so that the resistance 70 heats up with increase in current flow therethrough. In addition an electric heater element 74 is disposed in the chamber 72 and is connected in series with the bridge circuit power supply 24. In this way the temperature of the resistance 70 increases with increase of its own current and with increase in the voltage applied to the bridge circuit, whereby the magnitude of the resistance 70 varies approximately with the magnitude of the electric power supplied to the bridge circuit 14. Accordingly the effect of the resistance 70 may be termed power compensation.

Any increase in the resistance of the bridge arm including the resistance 20 and the resistance 70 necessarily means that the resistance 12 must be increased to balance the bridge. If the fluid mass flow increases, the voltage or power supplied to the bridge circuit 14 must be increased to keep the bridge circuit balanced. However, because of the resulting increase in the resistance 70 with increase in said bridge power, the bridge power must be increased sufficiently to effect an increase in the resistance 12 corresponding to the increase in the resistance 70. Therefore, as a result of the addition of the resistance 70 to the bridge circuit, it is necessary to consume more power in the resistance 12, with increase in the fluid mass flow, than would be consumed in the absence of the resistance 70. Accordingly by the addition of the resistance 70, the full line curve of Figure 3 can be changed to any of the dot-dash line curves of Figure 3. The extent to which the shape of the full line curve of Figure 3 is modified by the addition of the resistance 70 depends on the magnitude, and coefficient of resistance of the resistance 70, as well as on its increase in temperature with increase of fluid mass flow.

With the temperature compensating resistance 68 and with the power compensating resistance 70, the current supplied to the bridge circuit 14 is no longer exactly proportioned to the current in each arm of the bridge. This discrepancy is not large particularly for the values of the bridge resistances hereinafter specified, but if desired, the current element of the wattmeter 60 may be connected directly in series with the resistance 12 so that this meter accurately responds to changes in the power consumed in the resistance 12.

The fluid flow measuring system, herein described, has been found to provide a simple and accurate system for measuring airflow at atmospheric temperatures. In an actual operative system for measuring airflow at atmospheric temperatures, the bridge circuit was connected to a power source of 48 volts, the resistance 12 comprised "Hytempco" wire, the resistances 16, 18 and 20 comprised "Manganin" wire and the bridge circuit included a single resistance 68 of "Hytempco" wire. In the absence of any power compensation in said system, that is in the absence of any variable resistance 70 in the bridge arm 22, 34, the values of the various other resistances of the bridge circuit were as set forth in the following table for a particular air mass flow and at two temperatures of the air.

Table I

| Air Temp., °F. | Air Flow, lbs./hr. | Power in Res. 12, Watts | Resistance in ohms | | | | | |
|---|---|---|---|---|---|---|---|---|
| | | | Bridge arm 22, 32 (Res. 12) | Bridge arm 22, 34 | Bridge arm 21, 34 | Bridge arm 21, 32 | Res. 16 | Res. 68 |
| 68 | 18,000 | 92.5 | 3.50 | 5,560 | 10 | .0063 | .0150 | .0108 |
| 92 | 18,000 | 92.5 | 3.61 | 5,560 | 10 | .0065 | .0150 | .0114 |

The value of the resistance 12 at 68° F. was 1.35 ohms but, as indicated in Table I, when connected into the bridge circuit and with an air flow of 18,000 lbs. per hour at 68° F., 92.5 watts were expended in the resistance 12, thereby increasing the value of this resistance to 3.50 ohms to balance the bridge circuit.

As previously described the resistance of the bridge arm 22, 34 may be increased with increase in power supplied to the bridge circuit (power compensation) in order to change the relation between fluid mass flow and the power dissipated in the resistance 12. For this purpose the resistance of the bridge arm 22, 34 is split up to include a resistance 70. The following table sets forth changes in the value of the resistance of the bridge arm 22, 34 with the corresponding change in the value of the resistance 12 to keep the bridge balanced such that the relation between mass flow and power expended in the resistance 12 is substantially linear or proportional.

Table II

| Air Temp., °F. | Air Flow, lbs./hr. | Power expended in Res. 12, Watts | Resistance in ohms | | | | | |
|---|---|---|---|---|---|---|---|---|
| | | | Bridge arm 22, 32 (Res. 12) | Bridge arm 22, 34 | Bridge arm 21, 34 | Bridge arm 21, 32 | Res. 16 | Res. 68 |
| 68 | 3,600 | 18.0 | 2.20 | 3,490 | 10 | .0063 | .0150 | .0108 |
| 68 | 11,600 | 59.0 | 2.97 | 4,710 | 10 | .0063 | .0150 | .0108 |
| 68 | 14,200 | 73.0 | 3.20 | 5,080 | 10 | .0063 | .0150 | .0108 |
| 68 | 17,000 | 87.0 | 3.43 | 5,440 | 10 | .0063 | .0150 | .0108 |
| 68 | 18,000 | 92.5 | 3.50 | 5,560 | 10 | .0063 | .0150 | .0108 |
| 68 | 20,000 | 102.5 | 3.66 | 5,810 | 10 | .0063 | .0150 | .0108 |

In Table II no attempt has been made to indicate the relative values of the resistances 20 and 70 since they are subject to considerable variation depending on the material of the resistance 70 and the extent to which its temperature is raised by the heater 74. In addition it should be clear that the invention is not limited to the specific combination of bridge resistances described since obviously the material and value of the various resistances are subject to considerable variation. Preferably, however, the sum of the resistances of bridge arms 22, 32 and 21, 32 is much less than the sum of the resistance of bridge arms 21, 34 and 22, 34, whereby the power expended in resistances 18, 20 and 70 is very small and in addition the current flowing through the resistance 12 is substantially equal to the total current supplied to the bridge circuit. With this arrangement, the meter 60 provides an accurate measure of the electric power dissipated in the resistance 12 in spite of variations in the values of resistances 68 and 70.

The invention is obviously not limited to the specific form of bridge circuit described. As a further possible modification it is not necessary that the bridge be kept balanced. For example the relay 36 may be biased so that it only operates its contact 38 to engage contact 40 or 42 in response to departure of the bridge balance condition from a predetermined unbalance condition.

If the fluid in the duct 10 contains dirt or other foreign matter, the resistance 12 would gradually become covered with said matter thereby gradually altering its heat exchange characteristics. Accordingly it would be necessary either to periodically replace the resistance 12 or to periodically recalibrate the meter 60.

Figure 4 is a schematic view of an arrangement for automatically changing the resistance element 12. As illustrated a single length of wire 80 extends out from the duct 10 between a pair of rollers 82, around a pulley 84, and about a spool 86. The opposite ends of the wire 80 on the spool 86 are separated by a flange 87. The wire 80, like the resistance 12, has a high positive temperature coefficient of resistance and that portion of the wire 80 in the duct 10 forms the resistance 12 of the bridge circuit 14. Wire leads 88, corresponding to the leads 15 of Figure 1, electrically connect the portion of the wire 80 in the duct 10 into the bridge circuit through the rollers 82. The length of wire 80 is quite large and, for example, may be sufficient to provide 100 or more complete changes of wire across the duct 10.

With the arrangement of Figure 4, that portion of the wire 80 in the duct 10 may be progressively or intermittently changed by a corresponding rotation of the spool 86. For example, the length of the wire 80 extending across the duct 10 may be completely changed once a day. For this purpose a spool 86 may be manually rotated or a motor 90 may be provided for driving the spool. When the wire 80 has been completely unwound from one end of the spool 86 to its other end a new spool of wire is substituted therefor.

At this point it should be noted that small variations in the length of wire used for the resistance 12 do not affect the calibration of the meter 60 since the resistance 26 is automatically adjusted until the resistance 12 attains the proper value to balance the bridge circuit.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In a fluid flow system including a fluid flow duct; an electric resistance, said resistance having a positive temperature coefficient of resistance and being disposed in said duct for fluid flow thereover; an electric bridge circuit including said resistance; means adjustable to vary the electric power supplied to said bridge circuit; means responsive in its operation to changes in the balance of said bridge circuit from a predetermined condition; means controlled by said responsive means for adjusting said power varying means to maintain said bridge balance at said predetermined condition; a resistor; a normally open switch adapted to be closed to connect said resistor in parallel with the resistance in said duct; means operable to close said switch when the magnitude of said resistance exceeds a predetermined value; and means movable in response to changes in the electric power dissipated in said resistance.

2. In a fluid flow system including a fluid flow duct; an electric resistance, said resistance having a positive temperature coefficient of resistance and being disposed in said duct for fluid flow thereover; an electric bridge circuit including said resistance; means adjustable to vary the electric power supplied to said bridge circuit; means responsive in its operation to changes in the balance of said bridge circuit from a predetermined condition; means controlled by said responsive means for adjusting said power varying means to maintain said bridge balance at said predetermined condition; a resistor; a normally open switch adapted to be closed to connect said resistor in parallel with the resistance in said duct; means operable to close said switch upon departure, to a predetermined extent, of said bridge balance from said predetermined condition; and means movable in response to changes in the electric power dissipated in said resistance.

3. In a fluid flow system including a fluid flow duct; an electric resistance, said resistance having a positive temperature coefficient of resistance and being disposed in said duct for fluid flow thereover; an electric bridge circuit including said resistance and arranged to cause sufficient electric current to flow through said resistance to maintain its temperature substantially above that of said fluid; a second resistance included in said bridge circuit, said second resistance being variable with changes in its temperature; an electric heater for said second resistance; means adjustable to vary the electric power supplied to said bridge circuit; means responsive in its operation to changes in the balance of said circuit from a predetermined condition; means controlled by said responsive means for adjusting said power varying means to maintain said bridge balance at said predetermined condition and for varying the heating effect of said heater such that, upon an increase in flow through said duct, the increase in electric current flowing through said first resistance is greater than would take place in the absence of said heater; and means movable in response to changes in the electric power dissipated in said resistance.

4. In a fluid flow system including a fluid flow duct; an electric resistance, said resistance having a positive temperature coefficient of resistance and comprising a length of wire having a short portion of its length in said duct for fluid flow thereover; an electric bridge circuit including the portion of said wire in said duct; means adjustable to vary the electric power supplied to said bridge circuit; means responsive in its operation to changes in the balance of said bridge circuit from a predetermined condition; means controlled by said responsive means for adjusting said power varying means to maintain said bridge balance at said predetermined condition; means operable to feed said wire through said duct thereby varying the portion of the wire included in said circuit; and means movable in response to changes in the electric power dissipated in said resistance.

EDWARD W. SCHWARTZ.
WARREN H. BRAND.
HARVEY W. WELSH.

REFERENCES CITED

The following references are of record in the file of this patent:

UNITED STATES PATENTS

| Number | Name | Date |
|---|---|---|
| 1,156,660 | Berg | Oct. 12, 1915 |
| 1,691,600 | Brush, Jr., et al. | Nov. 13, 1928 |
| 2,049,306 | Matson | July 28, 1936 |
| 2,064,589 | Convers | Dec. 15, 1936 |